J. W. BROKAW.
Mowing Machine.
No. 20,251.
Patented May 18, 1858.
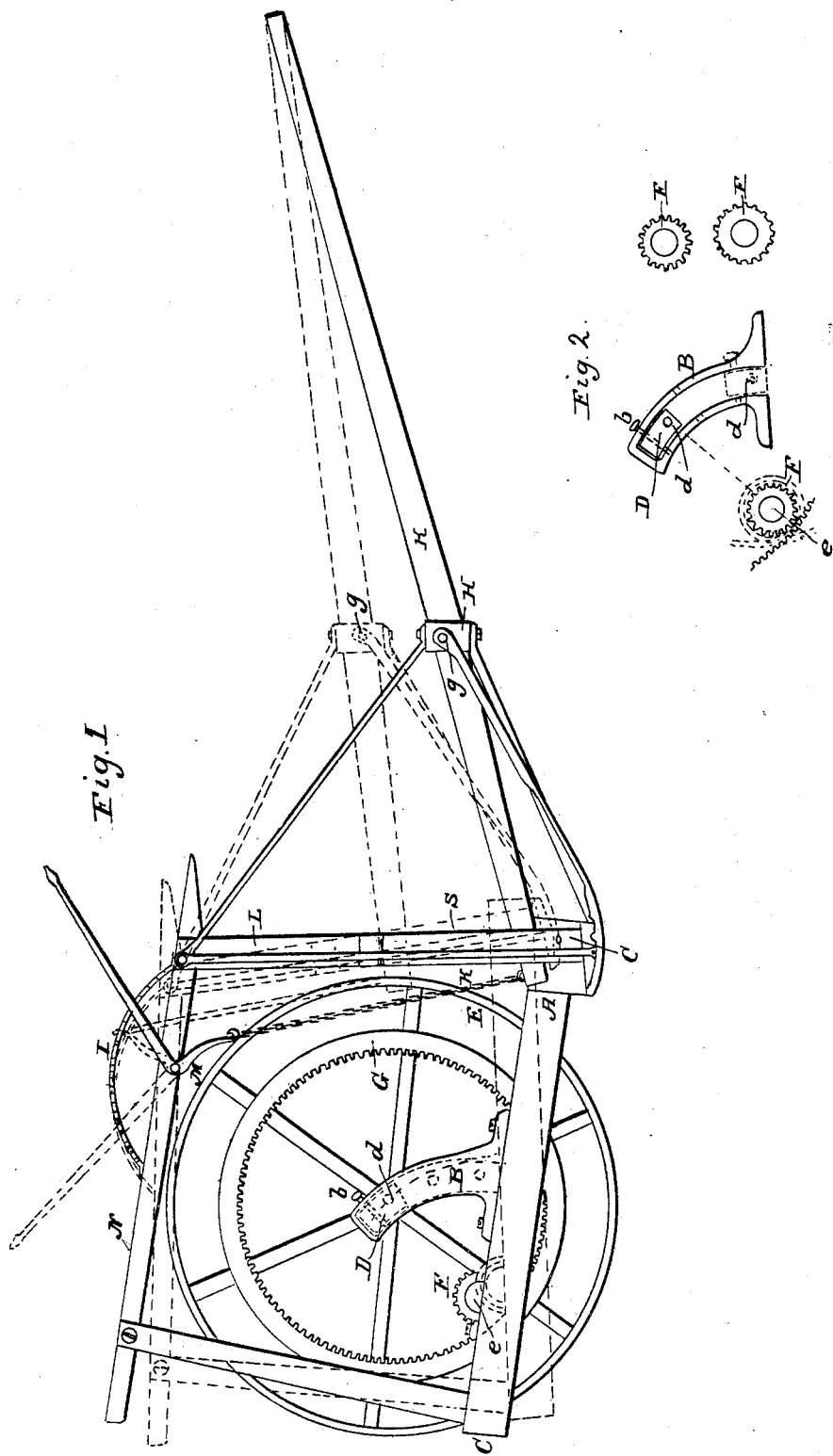

UNITED STATES PATENT OFFICE.

J. W. BROKAW, OF SPRINGFIELD, OHIO, ASSIGNOR TO WARDER, BROKAW & CHILD.

IMPROVEMENT IN REAPING AND MOWING MACHINES.

Specification forming part of Letters Patent No. 20,251, dated May 18, 1858.

*To all whom it may concern:*

Be it known that I, JOHN W. BROKAW, of Springfield, in the county of Clarke and State of Ohio, have invented a new and useful Improvement in Reaping and Mowing Machines, of which the following is a full, clear, and exact description, reference being had to the accompanying drawings, making part of this specification, in which—

Figure 1 represents a side elevation of the main frame of a harvesting-machine having my present improvement applied thereto, the cutting apparatus, &c., being removed; and Fig. 2, a diagram of the changes of the position of the master-wheel in relation to the stationary driving-shaft when the bearing-boxes are differently adjusted in the shell-standards.

In reaping grain it is customary to cut higher than in mowing grass, it being desirable to cut the latter at as short a distance from the ground as possible without injury to the cutting apparatus; and, again, in mowing a greater speed of the knife is wanted than in reaping. For these reasons in constructing a combined reaping and mowing machine it is necessary to provide some compensating arrangements by means of which the machine can be properly adapted to the special work required.

To effect these objects in a simple, substantial, and yet economical manner is the object of my present improvement, and which consists in the use of shell-standards provided with sliding boxes for the reception of the journals of the driving-wheel, in connection with a change of pinions, when the former are so arranged and constructed in relation to the pinion-shaft as that when the frame of the machine is lowered to adjust it for mowing it shall require a small pinion to mesh into the master-wheel, and a large one when raised for reaping, thus giving a fast motion for mowing and a slow one for reaping.

To enable others skilled in the art to make, construct, and use my improvement, I will now proceed to describe it in detail, omitting a description of such parts of a harvesting-machine as are not essential to the full understanding of my present improvement.

In the accompanying drawings the main frame of the machine is represented as consisting of two parallel rails, A, braced together in front and rear by means of connecting-bars C. To this main frame the cutting apparatus, platform, gearing parts, &c., are to be secured in any suitable manner. On the upper side of these rails are secured two hollow standards, B, into the grooves or guideways of which are fitted the bearing-boxes D of the axle *d* of the driving-wheel. Through the sides of these standards are pierced a series of holes, *a*, through which and a hole made in the sliding box D is passed a pin or bolt, *b*, to keep the latter in position when properly adjusted in the former. By this arrangement it will be seen that according as the bearing-boxes D are adjusted higher or lower in the standards so will the main frame of the machine be raised from or lowered toward the ground, thus affording a ready and efficient means of adapting the machine for reaping or mowing. Here it may be proper to remark that the cutting apparatus of the machine could be raised or lowered for these purposes by balancing the frame of the machine on an axle and causing it to turn on it as on a pivot; but such a plan is exceedingly objectionable because of the angle at which it throws the cutting apparatus, for if set so as to suit for reaping it will be clear that when depressed for mowing it cannot also be then in a proper angle for cutting in that position; hence the benefit of providing the machine with a ready means of adjusting the height of the cut by lowering or raising it in a vertical plane, or, in other words, by maintaining the frame in a horizontal plane while it is raised or lowered in a vertical one. But as it is also desirable when the machine is adjusted for mowing to give to the knife a greater speed than when used for reaping the guideways in the shell-standards B are so formed that by the adjustment of the bearing-boxes to lower the frame it shall throw the axle *d* of the driving-wheel E farther from the shaft *e*, that carries the pinion F, through which motion is communicated to the cutting apparatus, than when adjusted for reaping, consequently involving the use of a smaller pinion (hence giving increased speed) to mesh into the master-wheel G, and which in this instance is mounted on and secured to the side of the driving-wheel E, and vice versa, this being only the case when the teeth or cogs are cut or otherwise formed on the inner periphery of the master-wheel, the reverse being the case where they are formed on its outer periphery; but the former mode is deemed preferable.

In constructing the shell-standards B the form of the guideways will depend altogether upon the relation existing between the change of speed required and the corresponding change of height at which it is desired to cut, and which may be expressed by the following general formula:

$$\begin{cases} x = \sqrt{(R-r)^2 - l^2} \\ y = l \end{cases}$$

where $x$ and $y$ represent the co-ordinates of the guideways, their axis being taken through the center of the shaft $e$, $R$ = radius of the master-wheel G. $r$ = radii of the pinions F, and $l$ = elevation of the cut, the practical working of which is carried out in many ways by various rules well known to millwrights.

In front of the frame that supports the driving-wheel E, and on the side next the cutting apparatus, is secured a square collar or socket, H, by means of braces I extending from the frame in such manner as to give to it the greatest posssible strength and support—in this instance from above, below, and on either side. In securing the socket H it is so arranged as to be at a suitable distance from the ground for the reception and operation of the tongue—that is to say, its center below the line of draft. Through this socket the tongue K is passed far enough to enter into a vertical slot formed in a bracket, $f$, secured to the inner standard, L, that supports the top part of the frame, the tongue being then pivoted to the socket by a screw-bolt, $g$, or in any other suitable manner. In the formation of the socket it is made of a size sufficient to allow the tongue to turn freely on its pivot in a vertical plane.

To the rear end of the tongue K is secured a bolt or hook, $h$, to which is attached one end of a connecting rod or chain, $k$, whose other end is hinged or otherwise connected to the short arm of a lever, M, pivoted to the top frame-piece, N, of the driving-wheel frame, by operating which the rear end of the tongue may either be raised or lowered, as required, and held in either position by means of a clutch or rack, Z, or other device suitably arranged for that purpose—as, for instance, by passing a bolt through the bracket $f$ on the under side of the tongue. The tongue K, thus arranged and attached to the frame, acts as a lever, of which the fulcrum is situated at its forward end and supported on the horse's neck. The power being then applied at its rear end by means of the lever M and connecting-chain $k$ raises the front of the machine by the socket H, to which the tongue K is secured, the reverse being the case when the power that supports the rear end of the tongue is released, as the weight of the machine will cause the tongue K to descend to and rest upon a bolt that passes through the bracket $f$ into the standard L of the main frame, or until it reaches the full length of the chain $k$. By passing a bolt through the slot or bracket $f$ below the tongue it not only serves to regulate the height at which it is desired to cut when the machine has been properly adjusted to suit the kind of grain or grass to be harvested by the adjustment of the bearing-boxes D of the driving-wheel in the shell-standards B, but it also by being so placed leaves the front of the machine free to rise from and again descend to it as the machine accommodates itself to the undulations of the ground.

Having thus described my improvement in reaping and mowing machines, what I claim as new, and desire to secure by Letters Patent, is—

The construction and combination of the shell-standards B and sliding boxes D, when used in connection with a change of pinions, and operating in relation thereto in the manner and for the purposes set forth.

In testimony whereof I hereunto set my hand.

J. W. BROKAW.

Witnesses:
 ROSS MITCHELL,
 JAMES H. NELSON.